Patented Apr. 18, 1939

2,154,837

UNITED STATES PATENT OFFICE 2,154,837

MONOAZO DYESTUFFS INSOLUBLE IN WATER

Ernst Fischer, Offenbach-on-the-Main, Germany, assignor to General Aniline Works, Inc., New York, N. Y., a corporation of Delaware No Drawing. Application September 1, 1937, Serial No. 162,057. In Germany September 4, 1936

5 Claims. (Cl. 260—203)

The present invention relates to monoazo-dyestuffs insoluble in water; more particularly, it relates to dyestuffs of the following general formula:

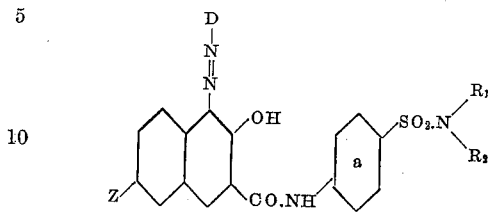

wherein the benzene radical $a$ may be further substituted, for instance, by alkyl-, alkoxy-, aryloxy-groups or halogen, $R_1$ and $R_2$ stand for hydrogen, alkyl, aryl, aralkyl or hydroaromatic radicals and the diazo-radical D stands for compounds of the following formula:

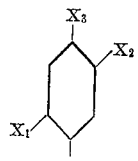

wherein $X_1$ stands for hydrogen, alkyl, alkoxy or halogen, $X_2$ and $X_3$ stand for hydrogen, alkyl, alkoxy, halogen or the group —NH.CO.$R_3$, $R_3$ being alkyl, aryl, aralkyl or a hydroaromatic radical, always one of the three substituents $X_1$, $X_2$ and $X_3$ being an alkoxy group and always one of the two substituents $X_2$ and $X_3$ being the group —NH.CO.$R_3$, Z stands for hydrogen, halogen or alkoxy, Z being alkoxy in case $X_2$ stands for the group —NH.CO.$R_3$ and simultaneously $X_1$ or $X_3$ represents hydrogen or halogen.

I have found that valuable violet to blue monoazo-dyestuffs may be obtained by combining the diazo-compound from an amine of the general formula:

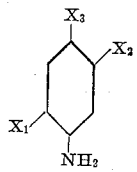

wherein $X_1$ stands for hydrogen, alkyl, alkoxy or halogen, $X_2$ and $X_3$ stand for hydrogen, alkyl, alkoxy, halogen or the group —NH.CO.$R_3$, $R_3$ being alkyl, aryl, aralkyl or a hydroaromatic radical, always one of the three substituents $X_1$, $X_2$ and $X_3$ being an alkoxy group and always one of the two substituents $X_2$ and $X_3$ being the group —NH.CO.$R_3$, with an arylide of 2-hydroxynaphthalene-3-carboxylic acid of the following general formula:

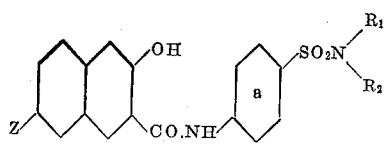

wherein the benzene radical $a$ may be further substituted, for instance, by an alkyl, alkoxy, aryloxy group or halogen, $R_1$ and $R_2$ stand for hydrogen, alkyl, aryl, aralkyl or hydroaromatic radicals and Z stands for hydrogen, halogen or alkoxy, Z being alkoxy in case $X_2$ stands for the group —NH.CO.$R_3$ and simultaneously $X_1$ or $X_3$ represents hydrogen or halogen, only such dyestuff components being used as do not contain any group lending solubility, such as the sulfonic or carboxylic acid group.

The dyestuffs can be produced in known manner on the fiber (native or regenerated cellulose), in substance or on a substratum. They may advantageously be used for the manufacture of very fast color lakes and for coloring cellulose esters and ethers, natural and artificial resins, organic plastic masses of high molecular weight as, for instance, products made from nitro-cellulose, resins prepared from formaldehyde and urea, phenols or amines, vinyl resins, natural rubber and the synthetic products which have a constitution and properties similar to those of natural rubber. The rubber dyeings thus obtained are of great technical value, since the new dyestuffs are insoluble in benzine, fast to vulcanization, very fast to light and do not bleed into white rubber during the vulcanization process. Especially with regard to non-bleeding the dyestuffs of the present invention are distinctly superior to the comparable combinations which are described in German patent specification 486,190 as well as to the blue water-insoluble monoazo-dyestuff, described in German patent specification 508,585, from diazotized 4-amino-4'- methoxydiphenylamine and 1-(2'-hydroxynaphthalene-3'-carbonylamino)-2-methoxybenzene-5-sulfonic acid dimethylamide.

The azo-components used in the present process may be prepared according to the process of British patent specification 281,795.

The following examples serve to illustrate the invention, but they are not intended to limit it thereto.

(1) The material is grounded with 6 grams per liter of 2,3-hydroxynaphthoyl-1'-amino-2'-chlorobenzene-4'-sulfodiethylamide and developed in known manner in a neutralized diazo-solution from 3 grams per liter of 1-amino-2,5-diethoxy-4-benzoylaminobenzene, then rinsed and soaped. A violet dyeing of good properties of fastness is obtained. The dyestuff corresponds with the following formula:

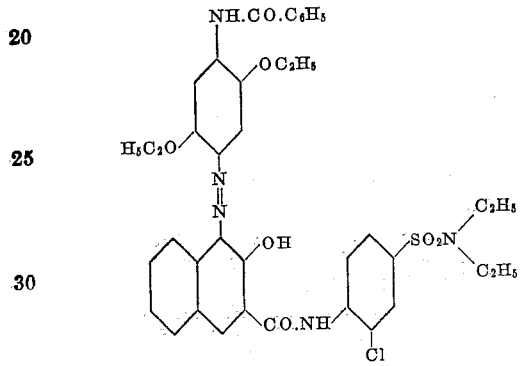

When in the same manner 2,3-hydroxynaphthoyl-1'-aminobenzene-4'-sulfo-N-methyl-benzylamide is used as coupling component, a reddish blue dyeing of similar properties is obtained.

(2) 15 grams of 1-amino-2,5-diethoxy-4-benzoylaminobenzene are diazotized in the usual manner. Thereupon the diazo-solution is mixed with sodium acetate in order to bind the excess of hydrochloric acid and then stirred into a solution of 21.2 grams of 2,3-hydroxynaphthoyl-1'-aminobenzene-4'-sulfocyclohexylamide in dilute caustic soda solution. The separated dyestuff is filtered with suction, well washed and dried. It forms a blue powder. The lakes prepared therefrom in known manner possess good properties of fastness.

The combination may also be effected in the presence of a substratum adapted for the preparation of color lakes.

(3) A pigment dyestuff which is adapted for coloring rubber products is prepared as described in Example 2. 4 per cent. of this dyestuff are incorporated with a suitable mixture of rubber, loading materials, sulfur and a vulcanization accelerator and the mixture is vulcanized in a vulcanizing press, while hot. There is obtained a blue vulcanizate which has a good fastness to light and neither bleeds into white rubber, nor gives rise to the phenomenon which is known as bluishing or efflorescence when the rubber articles are stored.

(4) 13.6 grams of 1-amino-2,5-dimethoxy-4-benzoylaminobenzene are diozatized in the usual manner. The diazo-solution which has been rendered neutral to Congo red paper by means of sodium acetate is stirred into a solution of 21.6 grams of 2,3-hydroxynaphthoyl-1'-aminobenzene-4'-sulfobenzylamide in dilute caustic soda solution. The blue dyestuff obtained is filtered with suction, well washed and dried.

It yields blue rubber dyeings which are fast to vulcanization and have very good properties of fastness, when a mixture of rubber, the usual admixtures and 4 per cent. of the dyestuff is immersed in a solution of sulfur chloride in benzine and vulcanized in the cold.

(5) 22.6 grams of 2,3-hydroxynaphthoyl-1'-amino-3'-chlorobenzene-4'-sulfanilide are dissolved in water and the necessary amount of caustic soda solution and reprecipitated with acetic acid, while well stirring. Into this suspension there is introduced, while stirring, a diazo-solution prepared in the usual manner from 12.8 grams of 1-amino-2-methoxy-5-methyl-4-benzoylaminobenzene while simultaneously adding the quantity of sodium acetate necessary for binding the excess of mineral acid. When coupling is complete, the violet dyestuff formed is filtered with suction, well washed and dried. It may be used for coloring casein artificial horn in the following manner:

A mixture is prepared from 200 grams of rennet casein, 8 grams of zinc white and 1 gram of the dyestuff and hardened by treatment with formaldehyde. A violet horn-like mass is obtained which has very good properties of fastness.

The following table illustrates a series of other dyestuffs which may be prepared according to the present invention and are especially adapted for coloring high molecular organic plastic masses:

| | Dyestuff from— | | Shade |
|---|---|---|---|
| | Diazo-compound of— | Coupled with— | |
| 1 | 1-amino-2,5-diethoxy-4-benzoylaminobenzene | 2,3-hydroxynaphthoyl-1'-amino-benzene-4'-sulfo-n-butylamide | Blue. |
| 2 | ----do---- | -2'-methylbenzene-4'-sulfo-N-methylanilide | Reddish blue. |
| 3 | 1-amino-2,5-dimethoxy-4-benzoylaminobenzene | -2',5'-dimethoxybenzene-4'-sulfodimethylamide | Violet. |
| 4 | ----do---- | -2'-methylbenzene-4'-sulfo-N-methylanilide | Reddish blue. |
| 5 | 1-amino-2,5-diethoxy-4-(2',5'-dichloro-)benzoylaminobenzene. | -2'-chlorobenzene-4'-sulfo-diethylamide | Do. |
| 6 | 1-amino-2,5-dimethoxy-4-(alpha-)naphthoyl-aminobenzene. | -benzene-4'-sulfo-N-methyl-benzylamide | Blue. |
| 7 | 1-amino-2-methoxy-5-methyl-4-benzoylamino-benzene | -benzene-4'-sulfo-cyclo-hexylamide | Violet. |
| 8 | 1-amino-2,4-dimethoxy-5-benzoylaminobenzene | -benzene-4'-sulfo-N-methyl-benzylamide | Do. |
| 9 | 1-amino-2-methoxy-5-chloro-4-benzoylamino-benzene | -2'-methylbenzene-4'-sulfo-N-methylanilide | Do. |
| 10 | 1-amino 2,5-diethoxy-4-phenacetylamino-benzene | -benzene-4'-sulfo-cyclo-hexylamide | Reddish blue. |
| 11 | 1-amino-2,5-diethoxy-4-hexahydro-benzoyl-aminobenzene. | -benzene-4'-sulfanilide | Violet. |
| 12 | 1-amino-2,5-dimethoxy-4-benzoylaminobenzene | -benzene-4'-sulfo-cyclo-hexylamide | Blue. |
| 13 | 1-amino-2,5-dimethoxy-4-acetaminobenzene | -benzene-4'-sulfanilide | Violet. |
| 14 | ----do---- | -2'-chlorobenzene-4'-sulfo-diethylamide | Do. |
| 15 | 1-amino-2,5-diethoxy-4-benzoylaminobenzene | -benzene-4'-sulfanilide | Blue. |
| 16 | ----do---- | -benzene-4'-sulfodiethylamide | Violet. |
| 17 | ----do---- | -benzene-4'-sulfo-N-ethylcyclohexylamide | Do. |
| 18 | ----do---- | -2'-chlorobenzene-4'-sulfoethylamide | Blue. |
| 19 | ----do---- | -2'-methylbenzene-4'-(sulfo-2''-amino-1'',2'',3'',4''-tetra-hydronaphthalene) | Do. |

| | Dyestuff from— | | Shade |
|---|---|---|---|
| | Diazo-compound of— | Coupled with— | |
| 20 | 1-amino-2-methoxy-5-benzoylaminobenzene | 2,3-hydroxynaphthoyl-1'-amino-2'-chlorobenzene-4'-sulfodiethylamide | Violet. |
| 21 | 1-amino-2-methoxy-5-methyl-4-benzoylaminobenzene | -benzene-4'-sulfanilide | Do. |
| 22 | 1-amino-2,5-diethoxy-4-benzoylaminobenzene | -benzene-4'-sulfamide | Blue. |
| 23 | -----do----- | -benzene-4'-sulfo-diphenylamide | Do. |
| 24 | -----do----- | -benzene-4'-sulfo-N-benzylanilide | Do. |
| 25 | -----do----- | -benzene-4'-sulfo-dibenzylamide | Do. |
| 26 | -----do----- | -benzene-4'-sulfo-N-benzylcyclohexylamide | Do. |
| 27 | -----do----- | -3'-chlorobenzene-4'-sulfanilide | Violet. |
| 28 | -----do----- | -benzene-4'-(sulfo-2''-amino-naphthalene) | Blue. |
| 29 | -----do----- | -benzene-4'-sulfo-dicyclohexylamide | Reddish blue. |
| 30 | 1-amino-2,5-dimethoxy-4-benzoylaminobenzene | -2',5'-diethoxybenzene-4'-sulfodimethylamide | Violet. |
| 31 | 1-amino-2-methoxy-4-acetaminobenzene | -benzene-4'-sulfanilide | Do. |
| 32 | 1-amino-3-methoxy-4-benzoylaminobenzene | -benzene-4'-sulfodiethylamide | Do. |
| 33 | 1-amino-2-methyl-5-methoxy-4-benzoylaminobenzene | -benzene-4'-sulfodiethylamide | Do. |
| 34 | 1-amino-2-chloro-5-methoxy-4-benzoylaminobenzene | -benzene-4'-sulfanilide | Do. |
| 35 | 1-amino-2,4-diethoxy-5-benzoylaminobenzene | -benzene-4'-sulfanilide | Do. |
| 36 | 1-amino-2,5-diethoxy-4-benzoylaminobenzene | 6-bromo-2,3-hydroxynaphthoyl-1'-amino-benzene-4'-sulfanilide | Do. |
| 37 | 1-amino-2-methoxy-5-benzoylaminobenzene | 6-methoxy-2,3-hydroxynaphthoyl-1'-amino-benzene-4'-sulfanilide | Blue. |
| 38 | 1-amino-2,5-diethoxy-4-benzoylaminobenzene | -benzene-4'-sulfanilide | Reddish blue. |
| 39 | 1-amino-4-methoxy-5-benzoylaminobenzene | -benzene-4'-sulfanilide | Blue. Violet. |

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

I claim:

1. The water-insoluble monoazo-dyestuffs of the following general formula:

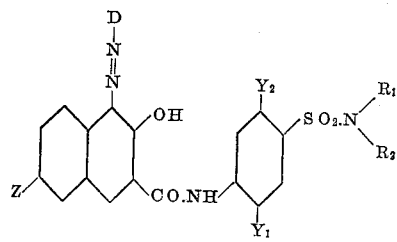

wherein $R_1$ and $R_2$ stand for members of the group consisting of hydrogen, alkyl, aryl, benzyl and hydroaromatic radicals, $Y_1$ and $Y_2$ stand for members of the group consisting of hydrogen, alkyl, alkoxy and halogen and the diazo-radical D stands for compounds of the following formula:

wherein $X_1$ stands for a member of the group consisting of hydrogen, alkyl, alkoxy and halogen, $X_2$ and $X_3$ stand for members of the group consisting of hydrogen, alkyl, alkoxy, halogen and the group —$NH.CO.R_3$, $R_3$ being a member of the group consisting of alkyl, benzyl, a radical of the benzene and naphthalene series and a hydroaromatic radical, always one of the three substituents $X_1$, $X_2$ and $X_3$ being an alkoxy group and always one of the two substituents $X_2$ and $X_3$ being the group —$NH.CO.R_3$, Z stands for a member of the group consisting of hydrogen, halogen and alkoxy, Z being alkoxy in case $X_2$ stands for the group —$NH.CO.R_3$ and one of the substituents $X_1$ and $X_3$ for a member of the group consisting of hydrogen and halogen, yielding fast violet to blue lakes and, when mixed with rubber products, violet to blue colorations of very good fastness to light and to vulcanization.

2. The water-insoluble monoazo-dyestuffs of the following general formula:

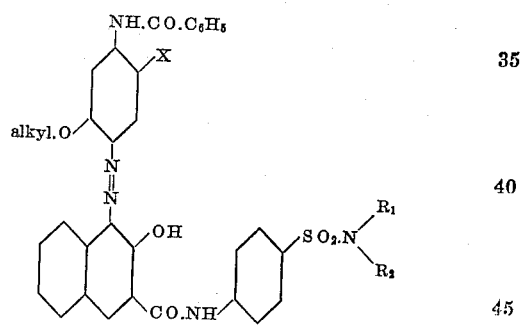

wherein $R_1$ and $R_2$ stand for members of the group consisting of hydrogen, alkyl, aryl, benzyl and hydroaromatic radicals and X stands for a member of the group consisting of hydrogen, alkyl, alkoxy and halogen, yielding fast violet to blue lakes and, when mixed with rubber products, violet to blue colorations of very good fastness to light and to vulcanization.

3. The water-insoluble monoazo-dyestuff of the following formula:

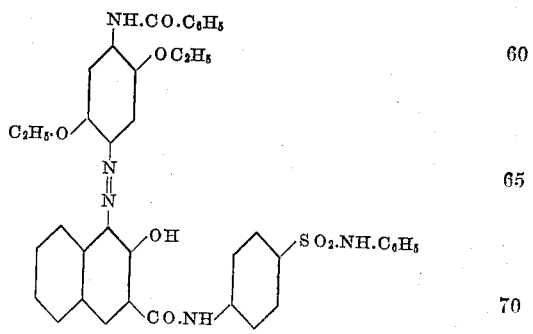

yielding fast blue lakes and, when mixed with rubber products, blue colorations of very good fastness to light and to vulcanization.

4. The water-insoluble monoazo-dyestuff of the following formula:

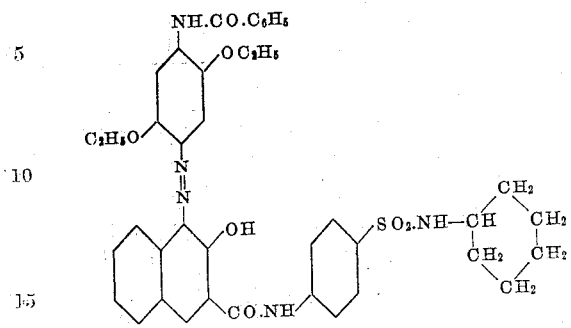

yielding fast blue lakes and, when mixed with rubber products, blue colorations of very good fastness to light and to vulcanization.

5. The water-insoluble monoazo-dyestuff of the following formula:

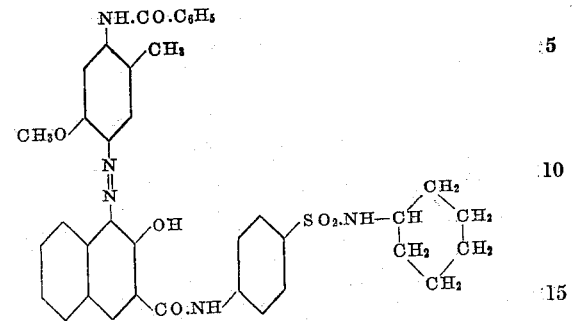

yielding fast violet lakes and, when mixed with rubber products, violet colorations of very good fastness to light and to vulcanization.

ERNST FISCHER.